(12) United States Patent
Kawashima

(10) Patent No.: US 9,409,490 B2
(45) Date of Patent: Aug. 9, 2016

(54) DEVICE ALIGNMENT IN INDUCTIVE POWER TRANSFER SYSTEMS

(71) Applicant: QUALCOMM Incorporated, San Diego, CA (US)

(72) Inventor: Kiyotaka Kawashima, Tokyo (JP)

(73) Assignee: QUALCOMM INCORPORATED, San Diego, CA (US)

( * ) Notice: Subject to any disclaimer, the term of this patent is extended or adjusted under 35 U.S.C. 154(b) by 215 days.

(21) Appl. No.: 14/040,496

(22) Filed: Sep. 27, 2013

(65) Prior Publication Data

US 2015/0094887 A1    Apr. 2, 2015

(51) Int. Cl.
*B60L 11/18*        (2006.01)
*G01B 7/31*        (2006.01)
*H02J 7/02*        (2016.01)

(52) U.S. Cl.
CPC ........... *B60L 11/1829* (2013.01); *B60L 11/182* (2013.01); *B60L 11/1833* (2013.01); *G01B 7/31* (2013.01); *H02J 7/025* (2013.01); *G01B 2210/58* (2013.01); *Y02T 90/168* (2013.01); *Y04S 30/12* (2013.01)

(58) Field of Classification Search
CPC ............ B60L 11/1829; B60L 11/1833; B60L 11/182; H02J 5/005; H02J 7/025; G01B 7/31; G01B 2210/58; Y04S 30/12; Y02T 90/168
See application file for complete search history.

(56) References Cited

U.S. PATENT DOCUMENTS

| | | | |
|---|---|---|---|
| 2010/0201315 A1 | 8/2010 | Oshimi et al. | |
| 2011/0254377 A1 | 10/2011 | Wildmer et al. | |
| 2011/0254503 A1 | 10/2011 | Widmer et al. | |
| 2011/0298422 A1 | 12/2011 | Failing | |
| 2013/0024059 A1* | 1/2013 | Miller et al. | 701/22 |
| 2013/0270921 A1* | 10/2013 | Boys et al. | 307/104 |
| 2014/0239729 A1* | 8/2014 | Covic | 307/104 |

FOREIGN PATENT DOCUMENTS

| | | |
|---|---|---|
| DE | 102011077427 A1 | 12/2012 |
| JP | 2011244624 A | 12/2011 |

(Continued)

OTHER PUBLICATIONS

International Search Report and Written Opinion—PCT/US2014/057010—ISA/EPO—Nov. 26, 2014.

(Continued)

*Primary Examiner* — John Q Nguyen
*Assistant Examiner* — Michael Kerrrigan
(74) *Attorney, Agent, or Firm* — Knobbe, Martens, Olson & Bear, LLP

(57) ABSTRACT

This disclosure provides systems, methods and apparatus for wireless power transfer and particularly wireless power transfer to remote systems such as electric vehicles. In one aspect, a wireless power receiver includes a first inductive element configured to receive wireless charging power from a transmitter. The wireless power receiver further includes a second inductive element, laterally separated from the first, configured to receive wireless charging power from the transmitter. The wireless power receiver further includes a position detector configured to determine a lateral position of the receiver relative to the transmitter based on characteristics of the first and second inductive elements.

28 Claims, 9 Drawing Sheets

(56) References Cited

FOREIGN PATENT DOCUMENTS

| | | |
|---|---|---|
| JP | 2012205379 A | 10/2012 |
| WO | 2013003527 A1 | 1/2013 |
| WO | WO-2013128815 A1 | 9/2013 |

OTHER PUBLICATIONS

U.S. Appl. No. 61/322,221, by Nigel P. Cook, filed Apr. 8, 2010.
Casanova J.J., et al., "A Loosely Coupled Planar Wireless Power System for Multiple Receivers," IEEE Transactions on Industrial Electronics, vol. 56 (8), Aug. 2009, pp. 3060-3068.

* cited by examiner

DEVICE ALIGNMENT IN INDUCTIVE POWER TRANSFER SYSTEMS

FIELD

The present disclosure relates generally to wireless power transfer, and more specifically to devices, systems, and methods for wireless power transfer to remote systems, such as vehicles including batteries, and for aligning wireless power transfer devices.

BACKGROUND

Remote systems, such as vehicles, have been introduced that include locomotion power derived from electricity received from an energy storage device, such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless power charging systems that are capable of transferring power in free space (e.g., via a wireless field) to be used to charge electric vehicles may overcome some of the deficiencies of wired charging solutions. As such, wireless power charging systems and methods that efficiently and safely transfer power for charging electric vehicles are desirable.

Inductive power transfer (IPT) systems are one means for the wireless transfer of energy. In IPT, a primary (or "base") power device transmits power to a secondary (or "pick-up") power receiver device. Each of the transmitter and receiver power devices include inductors, typically coils or windings of electric current conveying media. An alternating current in the primary inductor produces a fluctuating electromagnetic field. When the secondary inductor is placed in proximity to the primary inductor, the fluctuating electromagnetic field induces an electromotive force (EMF) in the secondary inductor, thereby transferring power to the secondary power receiver device.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a wireless power receiver. The wireless power receiver includes a first inductive element configured to receive wireless charging power from a transmitter. The wireless power receiver further includes a second inductive element, laterally separated from the first, configured to receive wireless charging power from the transmitter. The wireless power receiver further includes a position detector configured to determine a lateral position of the receiver relative to the transmitter based on characteristics of the first and second inductive elements.

In various embodiments, at least one characteristic can include an induced voltage at the first and second inductive elements. In various embodiments, the first and second inductive elements can be electrically connected in series in a "double D" configuration. In various embodiments, the wireless power receiver can further include a switch configured to electrically partition the first and second inductive elements.

In various embodiments, the wireless power receiver can further include a quadrature coil substantially between the first and second coils. In various embodiments, the position detector is further configured to determine a longitudinal position of the receiver relative to the transmitter based on a gradient of a scalar alignment parameter and/or a rotational direction of at least one wheel. In various embodiments, the wireless power receiver can include an electric vehicle including an automatic alignment system configured to align the electric vehicle with respect to the transmitter based on the determined lateral position.

Another aspect provides a method of detecting alignment at a wireless power receiver. The method includes receiving wireless power at a first inductive element from a transmitter. The method further includes receiving wireless power at a second inductive element from the transmitter. The method further includes determining a lateral position of the receiver relative to the transmitter based on characteristics of the first and second inductive elements.

In various embodiments, at least one characteristic can include an induced voltage at the first and second inductive elements. In various embodiments, the first and second inductive elements can be electrically connected in series in a "double D" configuration. In various embodiments, the method can further include including electrically partitioning the first and second inductive elements.

In various embodiments, the method can further include receiving wireless power at a quadrature coil substantially between the first and second coils. In various embodiments, the method can further include determining a longitudinal position of the receiver relative to the transmitter based on a gradient of a scalar alignment parameter and/or a rotational direction of at least one wheel. In various embodiments, the method can further include aligning an electric vehicle with respect to the transmitter based on the determined lateral position.

Another aspect provides an apparatus for detecting alignment at a wireless power receiver. The apparatus includes a first inductive element configured to receive wireless charging power from a transmitter. The apparatus further includes a second inductive element configured to receive wireless charging power from a transmitter. The apparatus further includes means for determining a lateral position of the receiver relative to the transmitter based on characteristics of the first and second inductive elements.

In various embodiments, at least one characteristic can include an induced voltage at the first and second inductive elements. In various embodiments, the first and second inductive elements can be electrically connected in series in a "double D" configuration. In various embodiments, the apparatus can further include means for electrically partitioning the first and second inductive elements.

In various embodiments, the apparatus can further include a quadrature coil substantially between the first and second coils. In various embodiments, the apparatus can further include means for determining a longitudinal position of the receiver relative to the transmitter based on a gradient of a scalar alignment parameter and/or a rotational direction of at least one wheel. In various embodiments, the apparatus can further include means for aligning an electric vehicle with respect to the transmitter based on the determined lateral position.

Another aspect provides a non-transitory computer-readable medium including code that, when executed, causes a wireless charging apparatus to receive wireless power at a first inductive element from a transmitter. The medium further includes code that, when executed, causes the apparatus to receive wireless power at a second inductive element from the transmitter. The medium further includes code that, when executed, causes the apparatus to determine a lateral position of the receiver relative to the transmitter based on characteristics of the first and second inductive elements.

In various embodiments, at least one characteristic can include an induced voltage at the first and second inductive elements. In various embodiments, the first and second inductive elements can be electrically connected in series in a "double D" configuration. In various embodiments, the medium can further include code that, when executed, causes the apparatus to electrically partition the first and second inductive elements.

In various embodiments, the medium can further include code that, when executed, causes the apparatus to receive wireless power at a quadrature coil substantially between the first and second coils. In various embodiments, the medium can further include code that, when executed, causes the apparatus to determine a longitudinal position of the receiver relative to the transmitter based on a gradient of a scalar alignment parameter and/or a rotational direction of at least one wheel. In various embodiments, the medium can further include code that, when executed, causes the apparatus to align an electric vehicle with respect to the transmitter based on the determined lateral position.

Figure 1:
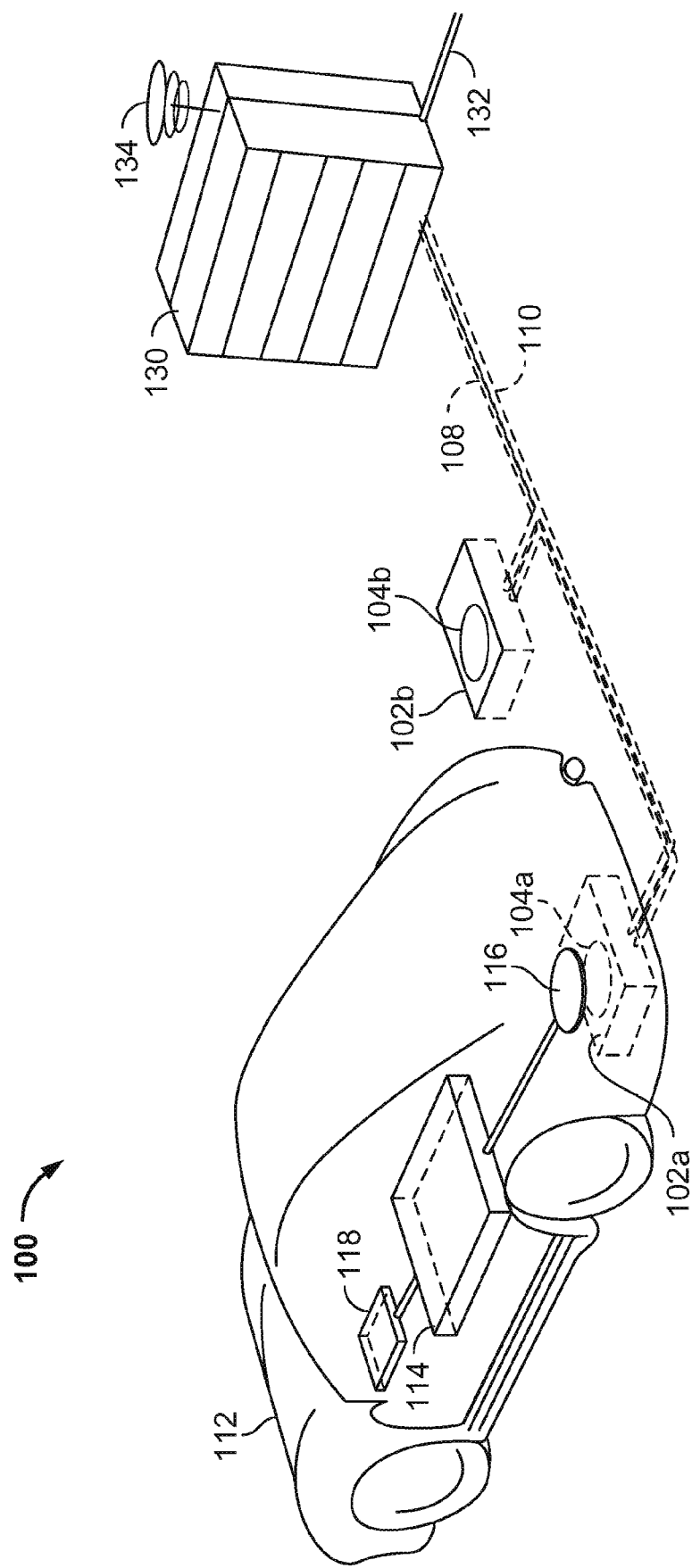
FIG. 1 is a diagram of an exemplary wireless power transfer system for charging an electric vehicle, in accordance with an exemplary embodiment.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments and is not intended to represent the only embodiments that may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments. The exemplary embodiments of the invention may be practiced without these specific details. In some instances, well-known structures and devices are shown in block diagram form in order to avoid obscuring the novelty of the exemplary embodiments presented herein.

Inductive power transfer (IPT) systems may transfer power optimally when the primary and secondary inductors are aligned. It is therefore desirable for an electric vehicle wireless power charging system to include a system for ensuring the vehicle is positioned to optimize alignment of the inductors prior to the start of charging.

As well as sub-optimal power transfer, there may be a safety risk if a primary inductor is energized for charging before the secondary inductor is correctly aligned. For example, an electric vehicle charging system may include ground-mounted power devices in which the primary inductor is housed that are easily accessible to bystanders and may be open for debris or the like to rest on or nearby the device. There may be a risk, be it perceived or real, to humans or animals from exposure to electromagnetic fields. Also, some types of materials resting on a wireless power transfer base device may be vulnerable to ignition. If a vehicle without a pick-up power device is positioned over an energized primary device, heating of parts of the vehicle may occur, which could be hazardous. As a result, some countries or regions may impose safety standards with which electric vehicle charging systems are legally required to comply. It is therefore desirable to minimize any such risks with wireless power transfer systems without significant expense and complexity.

Base charging devices may be equipped with sensors for detecting the presence of debris or moving objects near the device and refrain from energizing when a positive detection is made. However, in some instances, sensors are prone to error and involve the cost and complexity of additional componentry.

Electric vehicle IPT systems may use a variety of alignment systems to align the electric vehicle and charging device inductors and then to communicate that alignment has been achieved to the charging device, thus enabling it to safely energize. For example, alignment systems may include mechanical guides, sensors or wireless communication links (e.g. RF communication, Bluetooth, etc.) that provide feedback to a driver or vehicle guidance system. Once adequate alignment is achieved, a signal is sent back to the charging device, which is then able to safely energize. However, in some instances, such alignment mechanisms add complexity and cost to a wireless power transfer system because of the need for additional componentry for the alignment systems.

Similar systems may be used to select which of multiple charging devices to energize in a situation where a vehicle has a choice of charging devices from which to receive power, for example, in a parking lot with charging devices in each parking space. Accurately ascertaining the position of a vehicle may be used to select the correct charging device to energize, which may be difficult to do using some communication devices in some instances.

Wireless power transfer systems may use a wireless power link to communicate between the transmitter and receiver devices without additional specific communications antennae. For example, a controller may enable amplitude shift keying on the wireless power path at predefined intervals, which may be detected by a receiver device. The base device may include a load sensing circuit which is affected by the presence of a receiver device, thus detecting it. However, in some instances, such systems involve periodic energizing of the charging device to some degree even when an electric vehicle is not present, which may be undesirable from a safety perspective.

FIG. 1 is a diagram of an exemplary wireless power transfer system 100 for charging an electric vehicle 112, in accordance with an exemplary embodiment. The wireless power transfer system 100 enables charging of an electric vehicle 112 while the electric vehicle 112 is parked near a base wireless power charging system 102a. Spaces for two electric vehicles are illustrated in a parking area to be parked over corresponding base wireless power charging system 102a and 102b. In some embodiments, a local distribution center 130 may be connected to a power backbone 132 and configured to provide an alternating current (AC) or a direct current (DC) supply through a power link 110 to the base wireless power charging system 102a. The base wireless power charging system 102a also includes a base system induction coil 104a for wirelessly transferring or receiving power. An electric vehicle 112 may include a battery unit 118, an electric vehicle induction coil 116, and an electric vehicle charging system 114. The electric vehicle induction coil 116 may interact with the base system induction coil 104a, for example, via a region of the electromagnetic field generated by the base system induction coil 104a.

In some exemplary embodiments, the electric vehicle induction coil 116 may receive power when the electric vehicle induction coil 116 is located in an energy field produced by the base system induction coil 104a. The field corresponds to a region where energy output by the base system induction coil 104a may be captured by an electric vehicle induction coil 116. In some cases, the field may correspond to the "near field" of the base system induction coil 104a. The near-field may correspond to a region in which there are strong reactive fields resulting from the currents and charges in the base system induction coil 104a that do not radiate power away from the base system induction coil 104a. In some cases, the near-field may correspond to a region that is within about $½\pi$ of wavelength of the base system induction coil 104a (and vice versa for the electric vehicle induction coil 116).

Local distribution 130 may be configured to communicate with external sources (e.g., a power grid) via a communication backhaul 134, and with the base wireless power charging system 102a via a communication link 108.

In some embodiments, the electric vehicle induction coil 116 may be aligned with the base system induction coil 104a and, therefore, disposed within a near-field region simply by the driver positioning the electric vehicle 112 correctly relative to the base system induction coil 104a. Additionally or alternatively, the driver may be given visual feedback, auditory feedback, or combinations thereof to determine when the electric vehicle 112 is properly placed for wireless power transfer. Additionally or alternatively, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without driver intervention or with minimal driver intervention if, for instance, the electric vehicle 112 is equipped with a servo steering wheel, ultrasonic sensors, and intelligence to adjust the vehicle. Additionally or alternatively, the electric vehicle induction coil 116, the base system induction coil 104a, or a combination thereof may have functionality for displacing and moving the induction coils 116 and 104a relative to each other to more accurately orient them and develop more efficient coupling therebetween.

The base wireless power charging system 102a may be located in a variety of locations. As examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetic and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless power charging system 102a transfers power to the electric vehicle 112 and the electric vehicle 112 transfers power to the base wireless power charging system 102a, for example, in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

Figure 2:
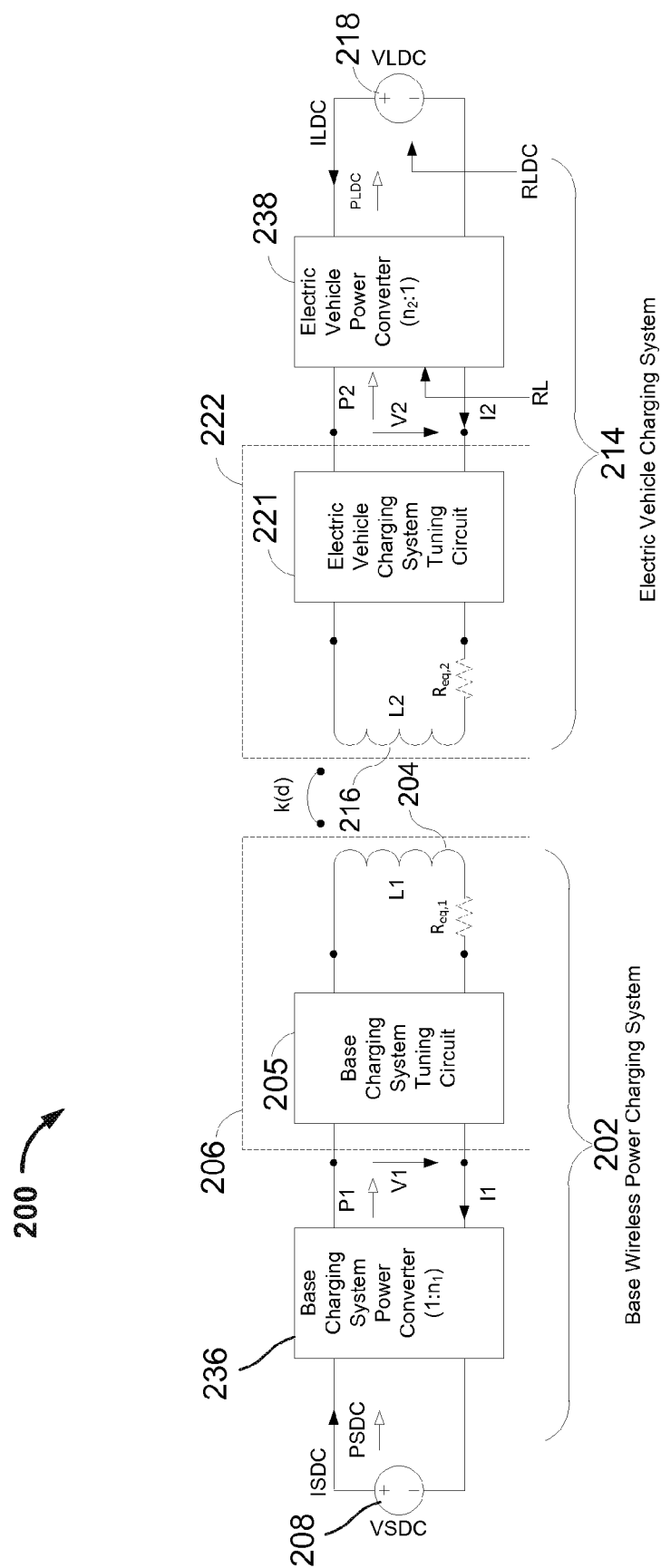
FIG. 2 is a schematic diagram of exemplary core components of the wireless power transfer system of FIG. 1.

FIG. 2 is a schematic diagram of exemplary core components of the wireless power transfer system 100 of FIG. 1. As shown in FIG. 2, the wireless power transfer system 200 may include a base system transmit circuit 206 including a base system induction coil 204 having an inductance $L_1$. The wireless power transfer system 200 further includes an electric vehicle receive circuit 222 including an electric vehicle induction coil 216 having an inductance $L_2$. Embodiments described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency.

A resonant frequency may be based on the inductance and capacitance of a transmit circuit including an induction coil (e.g., the base system induction coil 204). As shown in FIG. 2, inductance may generally be the inductance of the induction coil, whereas, capacitance may be added to the induction coil to create a resonant structure at a desired resonant frequency. As an example, a capacitor may be added in series with the induction coil to create a resonant circuit (e.g., the base system transmit circuit 206) that generates an electromagnetic field. Accordingly, for larger diameter induction coils, the value of capacitance for inducing resonance may decrease as the diameter or inductance of the coil increases. Inductance may also depend on a number of turns of an induction coil. Furthermore, as the diameter of the induction coil increases, the efficient energy transfer area of the near field may increase. Other resonant circuits are possible. As another example, a capacitor may be placed in parallel between the two terminals of the induction coil (e.g., a parallel resonant circuit). Furthermore, an induction coil may be designed to have a high quality (Q) factor to improve the resonance of the induction coil.

The coils may be used for the electric vehicle induction coil 216 and the base system induction coil 204. Using resonant structures for coupling energy may be referred to "magnetic coupled resonance," "electromagnetic coupled resonance," and/or "resonant induction." The operation of the wireless power transfer system 200 will be described based on power transfer from a base wireless power charging system 202 to an electric vehicle charging system 214 of an electric vehicle 112, but is not limited thereto. For example, the electric vehicle 112 may transfer power to the base wireless power charging system 202.

With reference to FIG. 2, a power supply 208 (e.g., AC or DC) supplies power $P_{SDC}$ to the base wireless power charging system 202 to transfer energy to an electric vehicle 112. The base wireless power charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power $P_1$ to the base system transmit circuit 206 including a base charging system tuning circuit 205 which may consist of reactive tuning components in a series or parallel configuration or a combination of both with the base system induction coil 204 to emit an electromagnetic field at a desired frequency. The capacitor $C_1$ may be provided to form a resonant circuit with the base system induction coil 204 that resonates at a desired frequency.

Both the base system transmit circuit 206 including the base system induction coil 204 and electric vehicle receive circuit 222 including the electric vehicle induction coil 216 may be tuned to substantially the same frequencies and may be positioned within the near-field of an electromagnetic field transmitted by one of the base system induction coil 204 and the electric vehicle induction coil 216. In this case, the base system induction coil 204 and electric vehicle induction coil 216 may become coupled to one another such that power may be transferred to the electric vehicle receive circuit 222 including an electric vehicle charging system tuning circuit 221 and electric vehicle induction coil 216. The electric vehicle charging system tuning circuit 221 may be provided to form a resonant circuit with the electric vehicle induction coil 216 that resonates at a desired frequency. The mutual coupling coefficient resulting at coil separation is represented by element k(d). Equivalent resistances $R_{eq,\ 1}$ and $R_{eq,\ 2}$ represent the losses that may be inherent to the induction coils 204 and 216 and any anti-reactance capacitors that may, in some embodiments, be provided in the base charging system tuning circuit 205 and electric vehicle charging system tuning circuit 221, respectively. The electric vehicle receive circuit 222 including the electric vehicle induction coil 216 and electric vehicle charging system tuning circuit 221 receives power $P_2$ and provides the power $P_2$ to an electric vehicle power converter 238 of an electric vehicle charging system 214.

The electric vehicle power converter 238 may include, for example, a LF/DC converter configured to convert power at an operating frequency back to DC power at a voltage level matched to the voltage level of an electric vehicle battery unit 218. The electric vehicle power converter 238 may provide the converted power $P_{LDC}$ to charge the electric vehicle battery unit 218. The power supply 208, base charging system power converter 236, and base system induction coil 204 may be stationary and located at a variety of locations as discussed in this disclosure. The battery unit 218, electric vehicle power converter 238, and electric vehicle induction coil 216 may be included in an electric vehicle charging system 214 that is part of electric vehicle 112 or part of the battery pack (not shown). The electric vehicle charging system 214 may also be configured to provide power wirelessly through the electric vehicle induction coil 216 to the base wireless power charging system 202 to feed power back to the grid. Each of the electric vehicle induction coil 216 and the base system induction coil 204 may act as transmit or receive induction coils based on the mode of operation.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle induction coil 216 to the electric vehicle power converter 238. Disconnecting the electric vehicle induction coil 216 may suspend charging and also may adjust the "load" as "seen" by the base wireless power charging system 202 (acting as a transmitter), which may be used to decouple the electric vehicle charging system 214 (acting as the receiver) from the base wireless power charging system 202. The load changes may be detected if the transmitter includes the load sensing circuit. Accordingly, the transmitter, such as a base wireless power charging system 202, may have a mechanism for determining when receivers, such as an electric vehicle charging system 214, are present in the near-field of the base system induction coil 204.

In operation, assuming energy transfer towards the vehicle or battery, input power is provided from the power supply 208 such that the base system induction coil 204 generates a field for providing the energy transfer. The electric vehicle induction coil 216 couples to the radiated field and generates output power for storage or consumption by the electric vehicle charging system 214 or the electric vehicle battery unit 218 of the electric vehicle 112. As described above, in some embodiments, the base system induction coil 204 and electric vehicle induction coil 216 are configured according to a mutual resonant relationship such that when the resonant frequency of the electric vehicle induction coil 216 and the resonant frequency of the base system induction coil 204 are very close or substantially the same. Transmission losses between the base wireless power charging system 202 and electric vehicle charging system 214 are minimal when the electric vehicle induction coil 216 is located in the near-field of the base system induction coil 204.

An efficient energy transfer may occur by coupling a large portion of the energy in the near field of a transmitting induction coil to a receiving induction coil rather than propagating most of the energy in an electromagnetic wave to the far-field. When in the near field, a coupling mode may be established between the transmit induction coil and the receive induction coil. The area around the induction coils where this near field coupling may occur may be referred to herein as a near field coupling mode region.

While not shown, the base charging system power converter 236 and the electric vehicle power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge one or more batteries.

The electric vehicle induction coil 216 and base system induction coil 204 may be referred to or configured as "loop" antennas, and more specifically, multi-turn loop antennas. The induction coils 204 and 216 may also be referred to herein or be configured as "magnetic" antennas. The term "coils" is intended to refer to a component that may wirelessly output or receive energy four coupling to another "coil." The coil may also be referred to as an "antenna" of a type that is configured to wirelessly output or receive power. Loop (e.g., multi-turn loop) antennas may be configured to include an air core or a physical core such as a ferrite core. An air core loop antenna may allow the placement of other components within the core area. Physical core antennas including ferromagnetic or ferrimagnetic materials may allow development of a stronger electromagnetic field and improved coupling.

Efficient transfer of energy between a transmitter and receiver may occur during matched or nearly matched resonance between a transmitter and a receiver. Further, even when resonance between a transmitter and receiver are not matched, energy may be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

According to some embodiments, coupling power between two induction coils that are in the near field of one another is disclosed. The near field may correspond to a region around the induction coil in which electromagnetic fields exist but may not propagate or radiate away from the induction coil. Near-field coupling-mode regions may correspond to a volume that is near the physical volume of the induction coil, typically within a small fraction of the wavelength. According to some embodiments, electromagnetic induction coils, such as single and multi turn loop antennas, are used for both transmitting and receiving since magnetic near field amplitudes in practical embodiments tend to be higher for magnetic type coils in comparison to the electric near fields of an electric type antenna (e.g., a small dipole). This allows for potentially higher coupling between the pair. Furthermore, "electric" antennas (e.g., dipoles and monopoles) or a combination of magnetic and electric antennas may be used.

Figure 3:
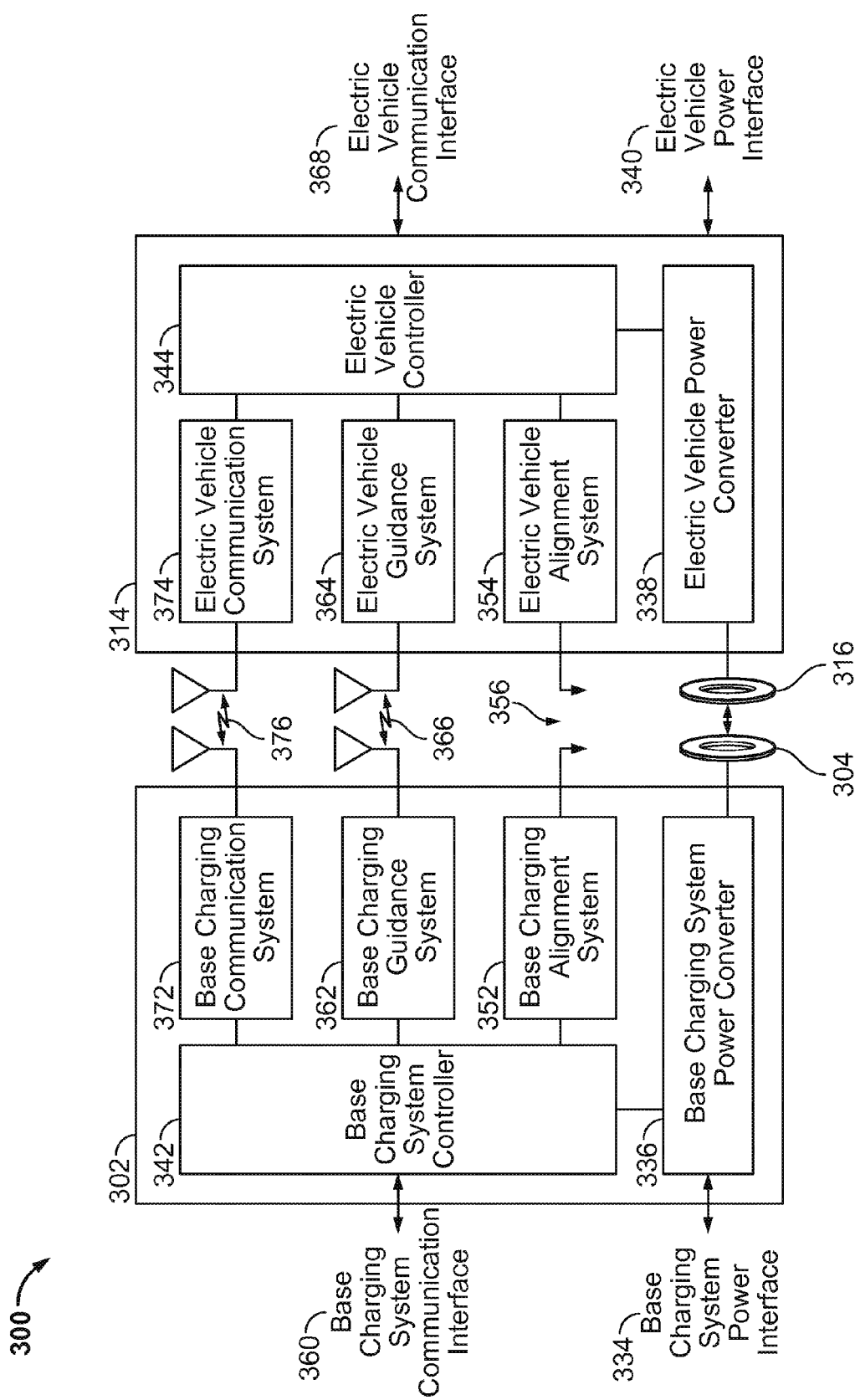
FIG. 3 is another functional block diagram showing exemplary core and ancillary components of the wireless power transfer system of FIG. 1.

FIG. 3 is another functional block diagram showing exemplary core and ancillary components of the wireless power transfer system 100 of FIG. 1. The wireless power transfer system 300 illustrates a communication link 376, a guidance link 366, and alignment systems 352, 354 for the base system induction coil 304 and electric vehicle induction coil 316. As described above with reference to FIG. 2, and assuming energy flow towards the electric vehicle 112, in FIG. 3 a base charging system power interface 360 can be configured to provide power to a charging system power converter 336 from a power source, such as an AC or DC power supply 126. The base charging system power converter 336 can receive AC or DC power from the base charging system power interface 360 to excite the base system induction coil 304 at or near its resonant frequency. The electric vehicle induction coil 316, when in the near field coupling-mode region, can receive energy from the near field coupling mode region to oscillate at or near the resonant frequency. The electric vehicle power converter 338 converts the oscillating signal from the electric vehicle induction coil 316 to a power signal suitable for charging a battery via the electric vehicle power interface.

The base wireless charging system 302 includes a base charging system controller 342 and the electric vehicle charging system 314 includes an electric vehicle controller 344. The base charging system controller 342 can include a base charging system communication interface to other systems (not shown) such as, for example, a computer, a wireless device, and a power distribution center, or a smart power grid. The electric vehicle controller 344 can include an electric vehicle communication interface to other systems (not shown) such as, for example, an on-board computer on the vehicle, other battery charging controller, other electronic systems within the vehicles, and remote electronic systems.

The base charging system controller 342 and electric vehicle controller 344 can include subsystems or modules for specific application with separate communication channels. These communications channels can be separate physical channels or separate logical channels. As non-limiting examples, a base charging alignment system 352 can communicate with an electric vehicle alignment system 354 through a communication link 356 to provide a feedback mechanism for more closely aligning the base system induction coil 304 and electric vehicle induction coil 316, either autonomously or with operator assistance. Similarly, a base charging guidance system 362 can communicate with an electric vehicle guidance system 364 through a guidance link 366 to provide a feedback mechanism to guide an operator in aligning the base system induction coil 304 and electric vehicle induction coil 316. In addition, there can be separate general-purpose communication links (e.g., channels), such as communication link 376, supported by base charging communication system 372 and electric vehicle communication system 374 for communicating other information between the base wireless power charging system 302 and the electric vehicle charging system 314. This information can include information about electric vehicle characteristics, battery characteristics, charging status, and power capabilities of both the base wireless power charging system 302 and the electric vehicle charging system 314, as well as maintenance and diagnostic data for the electric vehicle 112. These communication links or channels can be separate physical communication channels such as, for example, Dedicated Short-Range Communications (DSRC), IEEE 802.11x (e.g., Wi-Fi), Bluetooth, zigbee, cellular, infrared, etc.

Electric vehicle controller 344 can also include a battery management system (BMS) (not shown) that manages charge and discharge of the electric vehicle principal battery, a parking assistance system based on microwave or ultrasonic radar principles, a brake system configured to perform a semi-automatic parking operation, and a steering wheel servo system configured to assist with a largely automated parking 'park by wire' that can provide higher parking accuracy, thus reducing the need for mechanical horizontal induction coil alignment in any of the base wireless charging system 102a and the electric vehicle charging system 114. Further, electric vehicle controller 344 can be configured to communicate with electronics of the electric vehicle 112. For example, electric vehicle controller 344 can be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

Furthermore, the wireless power transfer system 300 can include detection and sensor systems. For example, the wireless power transfer system 300 can include sensors for use with systems to properly guide the driver or the vehicle to the charging spot, sensors to mutually align the induction coils with the required separation/coupling, sensors to detect objects that can obstruct the electric vehicle induction coil 316 from moving to a particular height and/or position to achieve coupling, and safety sensors for use with systems to perform a reliable, damage free, and safe operation of the system. For example, a safety sensor can include a sensor for detection of presence of animals or children approaching the wireless power induction coils 104a, 116 beyond a safety radius, detection of metal objects near the base system induction coil 304 that can be heated up (induction heating), detection of hazardous events such as incandescent objects on the base system induction coil 304, and temperature monitoring of the base wireless power charging system 302 and electric vehicle charging system 314 components.

The wireless power transfer system 300 can also support plug-in charging via a wired connection. A wired charge port can integrate the outputs of the two different chargers prior to transferring power to or from the electric vehicle 112. Switching circuits can provide the functionality as needed to support both wireless charging and charging via a wired charge port.

To communicate between a base wireless charging system 302 and an electric vehicle charging system 314, the wireless power transfer system 300 can use both in-band signaling and an RF data modem (e.g., Ethernet over radio in an unlicensed band). The out-of-band communication can provide sufficient bandwidth for the allocation of value-added services to the vehicle user/owner. A low depth amplitude or phase modulation of the wireless power carrier can serve as an in-band signaling system with minimal interference.

In addition, some communication can be performed via the wireless power link without using specific communications antennas. For example, the wireless power induction coils 304 and 316 can also be configured to act as wireless communication transmitters. Thus, some embodiments of the base wireless power charging system 302 can include a controller (not shown) for enabling keying type protocol on the wireless power path. By keying the transmit power level (amplitude shift keying) at predefined intervals with a predefined protocol, the receiver can detect a serial communication from the transmitter. The base charging system power converter 336 can include a load sensing circuit (not shown) for detecting the presence or absence of active electric vehicle receivers in the vicinity of the near field generated by the base system induction coil 304. By way of example, a load sensing circuit monitors the current flowing to the power amplifier, which is affected by the presence or absence of active receivers in the vicinity of the near field generated by base system induction coil 104a. Detection of changes to the loading on the power amplifier can be monitored by the base charging system controller 342 for use in determining whether to enable the oscillator for transmitting energy, to communicate with an active receiver, or a combination thereof.

To enable wireless high power transfer, some embodiments can be configured to transfer power at a frequency in the range from 10-60 kHz. This low frequency coupling can allow highly efficient power conversion that can be achieved using solid state devices. In addition, there can be less coexistence issues with radio systems compared to other bands.

The wireless power transfer system 100 described can be used with a variety of electric vehicles 102 including rechargeable or replaceable batteries.

Figure 4A:
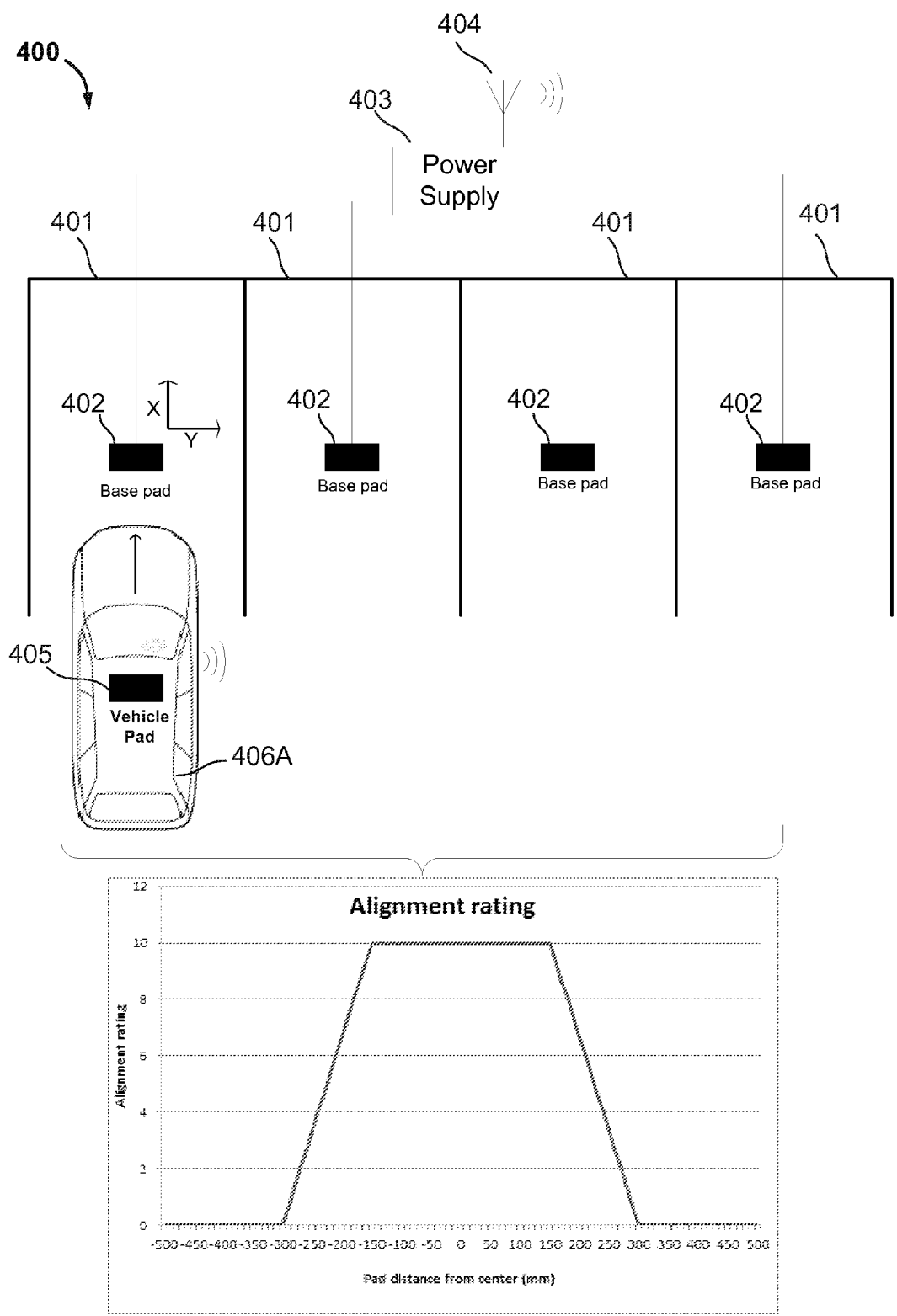
FIGS. 4A-C are diagrams of wireless power transfer system in accordance with exemplary embodiments.
Figure 4B:
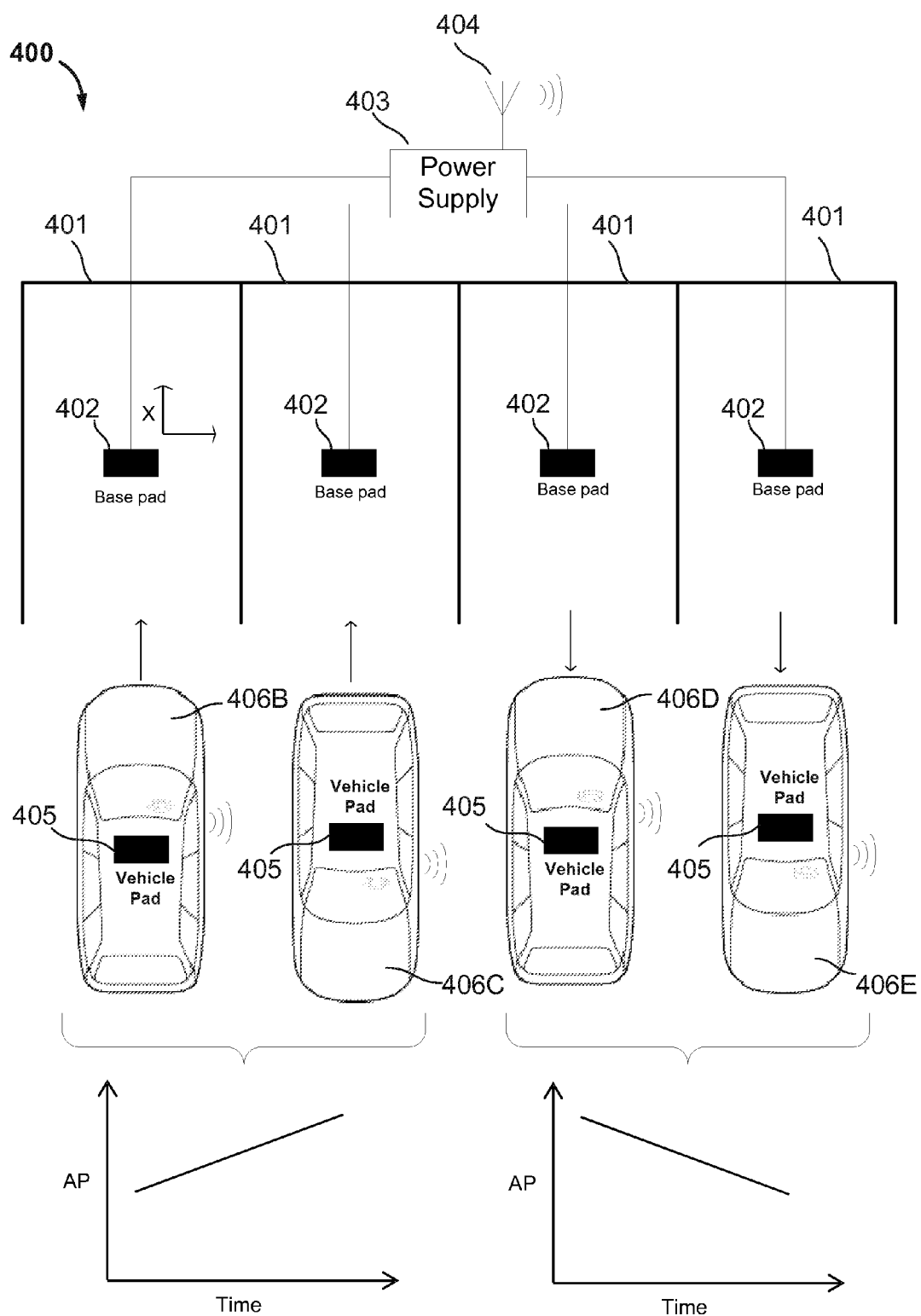
Figure 4C:
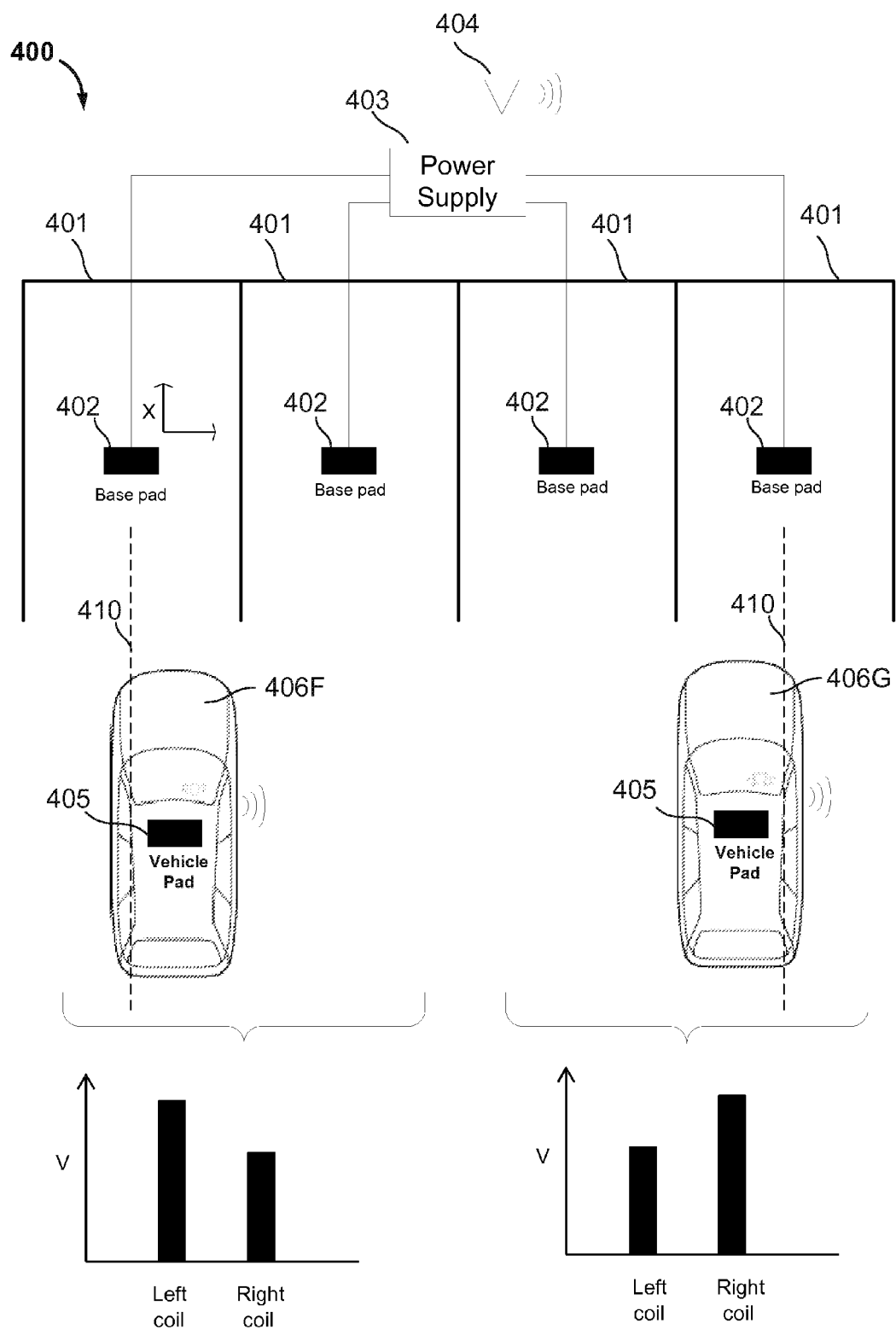

FIGS. 4A-C are diagrams of wireless power transfer system 400 in accordance with exemplary embodiments. In FIG. 4A, a plurality of car parking spaces 401 each have wireless power transfer transmitter devices 402 associated with them, for example, mounted on the ground inside the parking space. The transmitter devices 402 are connected to a single power supply 403, which is coupled to communication means 404. The transmitter devices 402 are suitable for charging a wireless power transfer receiver device 405 associated with an electric vehicle 406, for example, by the electric vehicle 406A driving into one of the parking spaces 401 to align the inductors of the transmitter and receiver devices such that power can be transferred by inductive power transfer. In various embodiments, the wireless power transfer transmitter devices 402 can include any of the base wireless power charging systems 102a (FIG. 1), 202 (FIG. 2), and 302 (FIG. 3), etc. In various embodiments, the electric vehicle 406 can include the electric vehicle 112 (FIG. 1). In various embodiments, the wireless power transfer receiver device 405 can include any of the electric vehicle charging systems 114 (FIG. 1), 214 (FIG. 2), and 314 (FIG. 3), etc.

In some embodiments, an alignment system such as the alignment system 352 (FIG. 3) or 354 (FIG. 3) can receive a scalar alignment rating or alignment parameter ("AP"), as shown in FIG. 4A. For example, the scalar alignment rating can indicate a distance from the induction coil 116 (FIG. 1) of the vehicle pad 405 to the base pad 402. In some embodiments, the scalar alignment rating can be based at least in part on a induced voltage across one or more induction coils 116. As shown in FIG. 4A, the alignment rating for the electric vehicle 406A increases as the electric vehicle 406A approaches the base pad 402, plateaus as the electric vehicle 406A passes over the base pad 402, and decreases as the electric vehicle 406A moves away from the base pad 402.

In FIG. 4B, for example, an electric vehicle 406B is facing inwards, towards the parking space 401. The electric vehicle 406B is moving towards the base pad 402. Accordingly, the alignment parameter is increasing over time. One or more sensors can report forward wheel rotation, for example, at the alignment system 352 (FIG. 3). The alignment system 352 can determine that the electric vehicle 406B is approaching the base pad 402 head first based on one or more of the trend of the alignment parameter over time, a detected orientation of the electric vehicle 406B, and/or a detected wheel rotation.

Another electric vehicle 406C is facing outwards, away from the parking space 401. The electric vehicle 406C is moving towards the base pad 402. Accordingly, the alignment parameter is increasing over time. One or more sensors can report reverse wheel rotation, for example, at the alignment system 352 (FIG. 3). The alignment system 352 can determine that the electric vehicle 406C is approaching the base pad 402 tail first (i.e., backing into the parking space 401) based on one or more of the trend of the alignment parameter over time, a detected orientation of the electric vehicle 406C, and/or a detected wheel rotation.

Another electric vehicle 406D is facing inwards, towards the parking space 401. The electric vehicle 406B is moving away from the base pad 402. Accordingly, the alignment parameter is decreasing over time. One or more sensors can report reverse wheel rotation, for example, at the alignment system 352 (FIG. 3). The alignment system 352 can determine that the electric vehicle 406D is leaving the base pad 402 tail first (i.e., backing out of the parking space 401) based on one or more of the trend of the alignment parameter over time, a detected orientation of the electric vehicle 406D, and/or a detected wheel rotation.

Another electric vehicle 406E is facing outwards, away from the parking space 401. The electric vehicle 406E is moving away from the base pad 402. Accordingly, the alignment parameter is decreasing over time. One or more sensors can report forward wheel rotation, for example, at the alignment system 352 (FIG. 3). The alignment system 352 can determine that the electric vehicle 406E is leaving the base pad 402 head first based on one or more of the trend of the alignment parameter over time, a detected orientation of the electric vehicle 406E, and/or a detected wheel rotation.

In embodiments where the electric vehicle 406 controls alignment through an autopilot system (such as the electric vehicle guidance system 364), the scalar alignment rating alone may not provide enough information to guide the vehicle. For example, it would be advantageous to detect vehicle position both laterally (e.g., along the Y axis shown above) and longitudinally (e.g., along the X axis shown above), as well as to detect vehicle orientation (e.g., facing inwards or outwards).

In some embodiments, the vehicle pad 405 of the electric vehicle 406 can include a plurality of coils. In some embodiments, the electric vehicle 406 can include a "double D" coil. The "double D" coil can include a left coil "DL" and a right coil "DR." The "double D" coil can be configured to receive wireless power from the base pad 402. The vehicle can include a voltage sensor configured to measure a voltage across the entire "double D" coil. In some embodiments, the alignment parameter can be based on the voltage across the entire "double D" coil.

In some embodiments, the "double D" coil additionally or alternatively includes a voltage sensor configured to separately measure voltage across the left and right coils. In some embodiments, the voltage sensor is switchably connected to the "double D" coil. In some embodiments, the alignment parameter can be based on a combination of the separately measured voltages across the left and right coils.

In some embodiments, the vehicle pad 405 can include a quadrature coil ("Q coil") and a voltage sensor configured to measure a voltage across the quadrature coil. In some embodiments, the alignment parameter can be based on the voltage across the quadrature coil. In some embodiments, the alignment parameter can be based on a combination of the voltages across the Q coil and the double D coil.

Figure 6:
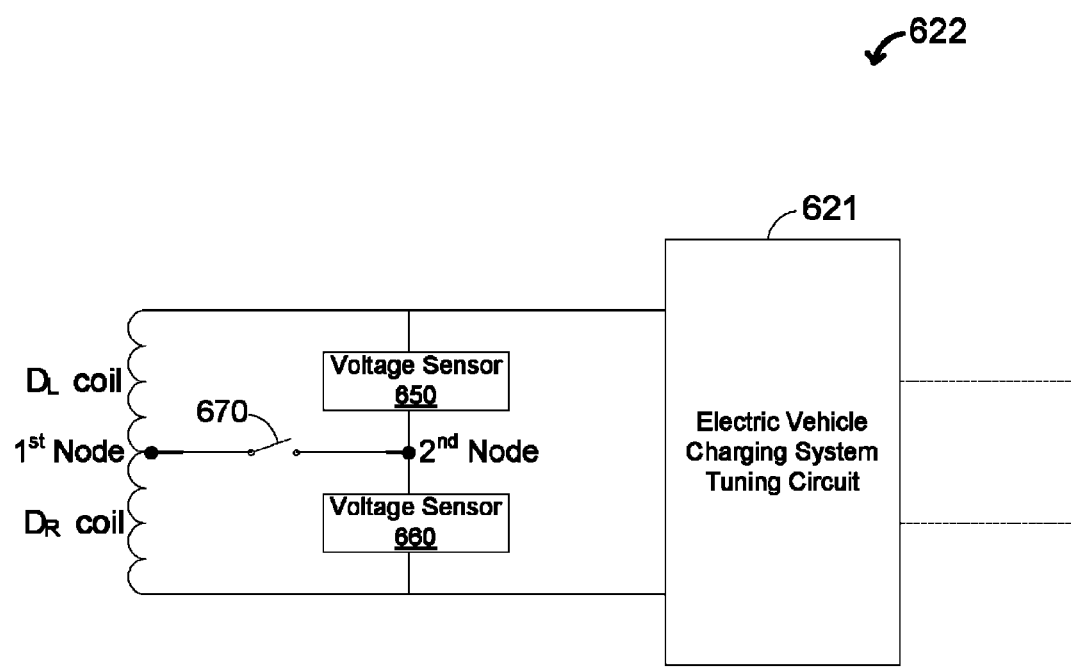
FIG. 6 shows an electric vehicle receive circuit according to one embodiment.

In various other embodiments, the vehicle pad 405 can include a least left and right coils, which may not be configured in a double D configuration. The left and right coils can be laterally spaced. The vehicle pad 405 can further include a center coil, which may not be configured as a Q coil. Accordingly, in various embodiments, the vehicle can include one or more coils which can be electronically partitioned into a plurality of virtual coils. Each coil (or partitioned coil) coil can be physically separated by known distances. FIG. 6, described in greater detail below, shows one embodiment of a left and right coil, attendant voltage sensors, and a partitioning switch.

In FIG. 4C, an electric vehicle 406F is substantially situated to a right side of a center line 410 of the base pad 402. Accordingly, a higher voltage is induced at the left coil than the right coil. The alignment system 352 can receive the measured voltages at the left and right coils and determine that the electric vehicle 406F is situated to the right of the base pad 402. In the illustrated embodiment, the electric vehicle 406F is facing towards the base pad 402. In embodiments where the electric vehicle 406F is facing away from the base pad 402, voltage readings from the left and right coils will be reversed. The alignment system 352 can further determine a trend of the alignment parameter over time. Thus, the alignment system 352 can determine an approximate position of the electric vehicle 406F with respect to the base pad 402 based on one or more of the trend of the alignment parameter over time, a detected orientation of the electric vehicle 406F, a detected wheel rotation, and/or a detected voltage at the left and right coils.

Another electric vehicle 406G is substantially situated to a left side of a center line 410 of the base pad 402. Accordingly, a higher voltage is induced at the right coil than the left coil. The alignment system 352 can receive the measured voltages at the left and right coils and determine that the electric vehicle 406G is situated to the left of the base pad 402. In the illustrated embodiment, the electric vehicle 406G is facing towards the base pad 402. In embodiments where the electric vehicle 406G is facing away from the base pad 402, voltage readings from the left and right coils will be reversed. The alignment system 352 can further determine a trend of the alignment parameter over time. Thus, the alignment system 352 can determine an approximate position of the electric vehicle 406G with respect to the base pad 402 based on one or more of the trend of the alignment parameter over time, a detected orientation of the electric vehicle 406G, a detected wheel rotation, and/or a detected voltage at the left and right coils.

Figure 5:
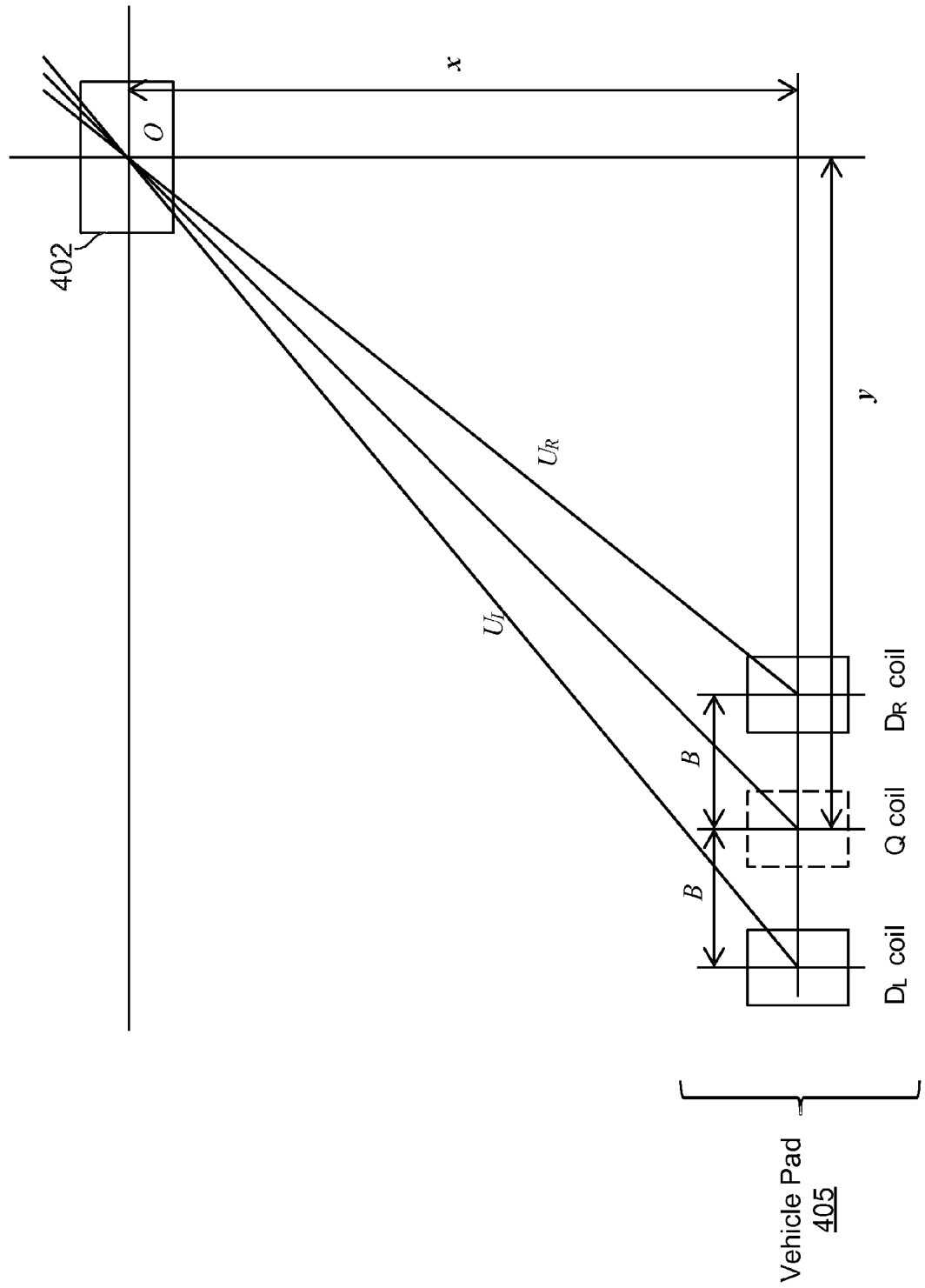
FIG. 5 shows a spatial diagram of a vehicle pad and a base pad.

FIG. 5 shows a spatial diagram of a vehicle pad 405 (FIG. 4) and a base pad 402 (FIG. 4). As discussed above, a position detection system can determine an estimated longitudinal distance x, lateral distance y, and total distance $U_X$ to the base pad according to Equations 1-4 below, based on an induced voltage $V_X$ at each of the left and right coils and the known distance B between the left and right coils. The estimated distance $U_X$ can be a function of the induced voltages $V_X$.

Equations 1-4 are for cases where $U_L <= U_R$ (i.e., the vehicle pad 405 is substantially to the left of the base pad 402). In cases where $U_L > U_R$, $U_L$ and $U_R$ can be reversed without loss of generality.

$$x^2 + (y + B)^2 = U_L^2 \quad (1)$$

$$x^2 + (y - B)^2 = U_R^2 \quad (2)$$

$$\therefore y = \frac{U_L^2 - U_R^2}{4B} \quad (3)$$

$$\therefore x = \sqrt{U_R^2 - y^2} \quad (4)$$

FIG. 6 shows an electric vehicle receive circuit 622 according to one embodiment. As shown, the electric vehicle receive circuit 622 includes an electric vehicle charging system tuning circuit 621, a left coil $D_L$, a right coil $D_R$, a left voltage sensor 650, a right voltage sensor 660, and a switch 670. In various embodiments, the electric vehicle receive circuit can include the electric vehicle receive circuit 222 discussed above with respect to FIG. 2.

The electric vehicle charging system tuning circuit 621 serves to form a resonant circuit with an electric vehicle induction coil (for example, the electric vehicle induction coil 216 discussed above with respect to FIG. 2) that resonates at a desired frequency. In various embodiments, the electric vehicle charging system tuning circuit 621 can include the electric vehicle charging system tuning circuit 221 (FIG. 2).

The left coil $D_L$ can include a left half of a double D, a left half of another type of integrated coil, or a separate coil. In various embodiments, the left coil $D_L$ can include the left coil $D_L$ discussed above with respect to FIGS. 4C and 5. The right coil $D_R$ can include a right half of a double D, a right half of another type of integrated coil, or a separate coil. In various embodiments, the left coil $D_R$ can include the left coil $D_R$ discussed above with respect to FIGS. 4C and 5.

The left and right voltage sensors 650 and 660 serve to measure the voltages across the left and right coils $D_L$ and $D_R$. In an embodiment, the output of the left and right voltage sensors 650 and 660 can be summed to determine the voltage across a combined coil D. In an embodiment, the electric vehicle alignment system 354 (FIG. 3) can receive output from the left and right voltage sensors 650 and 660.

The switch 670 serves to decrease the influence of additional wire going to the left and right voltage sensors 650 and 660 from the left and right coils $D_L$ and $D_R$. For example, additional wire can create energy loss, EMC, etc. In an embodiment, the electric vehicle alignment system 354 (FIG. 3) can close the switch 670 periodically, intermittently, and/or randomly or pesudorandomly when sampling or preparing to sample the output of the left and right voltage sensors 650 and 660. In some embodiments, the switch 670 can be omitted.

Figure 7:
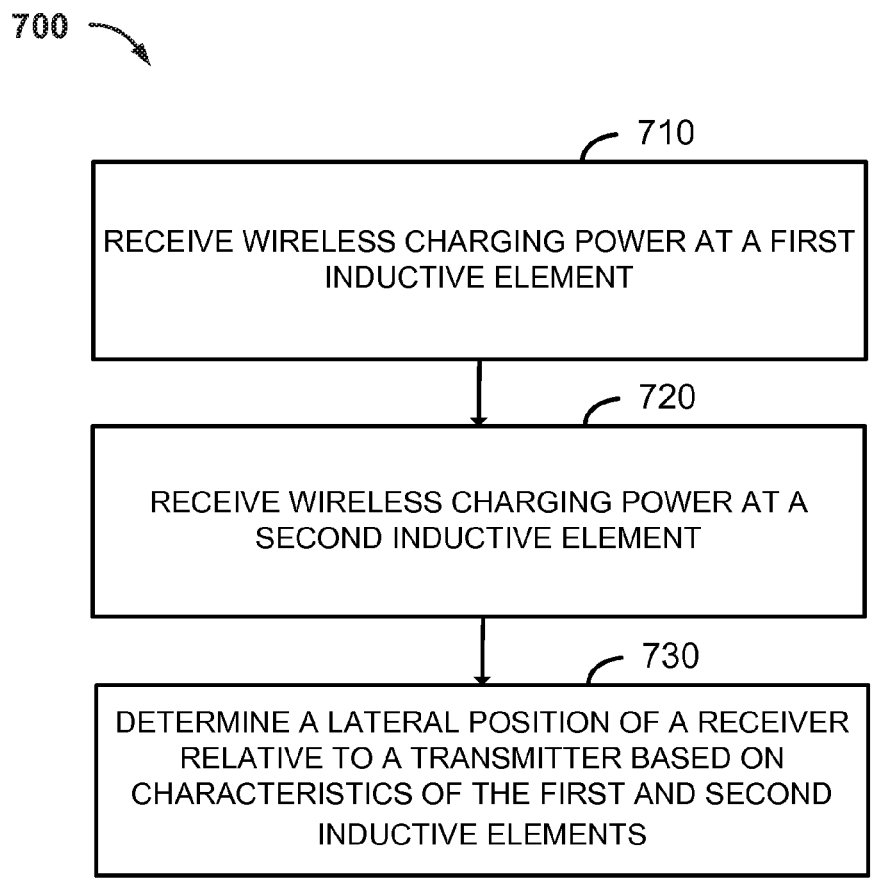
FIG. 7 is a flowchart of an exemplary method of wireless power alignment detection.

FIG. 7 is a flowchart 700 of an exemplary method of wireless power alignment detection. Although the method of flowchart 700 is described herein with reference to the wireless power transfer systems 100, 200, 300, and 400 discussed above with respect to FIGS. 1-4C and the electric vehicle alignment system 354 discussed above with respect to FIG. 3, a person having ordinary skill in the art will appreciate that the method of flowchart 700 can be implemented by another device described herein, or any other suitable device. In an embodiment, the steps in flowchart 700 can be performed by a processor or controller such as, for example, the controller 342 (FIG. 3) and/or the controller 344 (FIG. 3). Although the method of flowchart 700 is described herein with reference to a particular order, in various embodiments, blocks herein can be performed in a different order, or omitted, and additional blocks can be added.

First, at block 710, the electric vehicle 112 receives wireless charging power at a first inductive element. For example, the electric vehicle 112 can receive the wireless charging power from the base wireless power charging system 102a at the left coil $D_L$ (FIG. 6). The wireless charging power can be used to charge, for example, the electric vehicle battery unit 218 (FIG. 2).

Next, at block 720, the electric vehicle 112 receives wireless charging power at a second inductive element. For example, the electric vehicle 112 can receive the wireless power from the base wireless power charging system 102a at the right coil $D_R$ (FIG. 6). The wireless charging power can be used to charge, for example, the electric vehicle battery unit 218 (FIG. 2). In some embodiments, the electric vehicle 112 can at least partially run on power received at both the first inductive element and the second inductive element.

Then, at block 730, the electric vehicle 112 determines a lateral position of a receiver relative to a transmitter based on characteristics of the first and second inductive elements. For example the electric vehicle alignment system 354 can determine a position of the electric vehicle 112 based on measured voltages across the left coil $D_L$ and the right coil $D_R$ according to Equations 1-4, discussed above with respect to FIG. 6. Particularly, the electric vehicle alignment system 354 can receive output from the left and right voltage sensors 650 (FIG. 6) and 660 (FIG. 6).

In various embodiments, at least one characteristic includes an induced voltage at the first and second inductive elements. In various embodiments, the first and second inductive elements are electrically connected in series in a "double D" configuration. In various embodiments, the electric vehicle 112 can include a switch configured to electrically partition the first and second inductive elements. The electric vehicle alignment system 354 can selectively enable the switch when taking voltage measurements at the left and right voltage sensors 650 (FIG. 6) and 660 (FIG. 6).

In various embodiments, the electric vehicle 112 can include a quadrature coil substantially between the first and second coils. In various embodiments, a position detector can be configured to determine a longitudinal position of the receiver relative to the transmitter based on a gradient of a scalar alignment parameter and/or a rotational direction of at least one wheel. In various embodiments, the electric vehicle 112 can include an automatic alignment system configured to align the electric vehicle 112 with respect to the base wireless power charging system 102a based on the determined lateral position.

Figure 8:
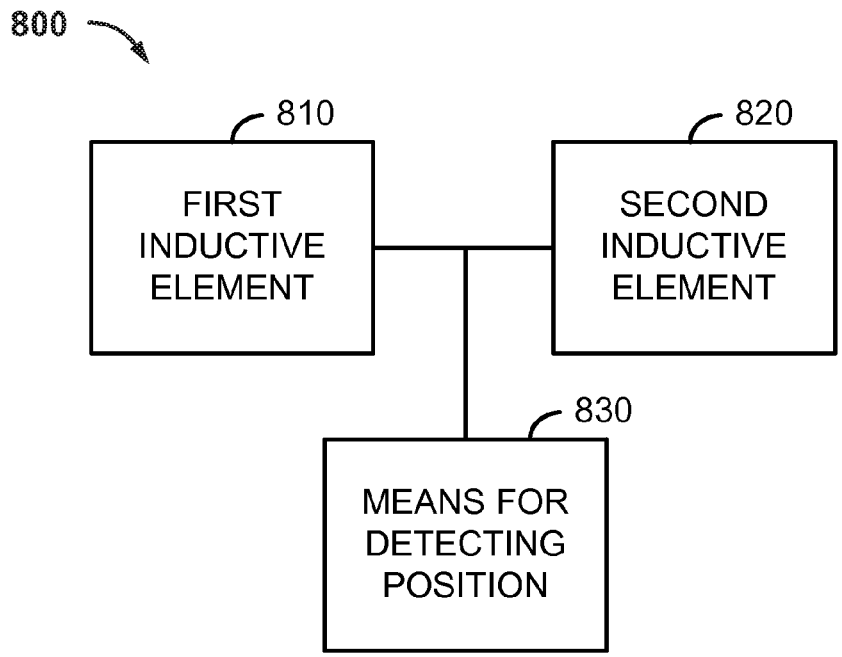
FIG. 8 is a functional block diagram of an apparatus for detecting wireless power alignment.

FIG. 8 is a functional block diagram of an apparatus 800 for detecting wireless power alignment. Those skilled in the art will appreciate that an apparatus for detecting wireless power alignment can have more components than the simplified apparatus 800 shown in FIG. 8. The apparatus 800 for detecting wireless power alignment shown includes only those components useful for describing some prominent features of implementations within the scope of the claims. The apparatus 800 for detecting wireless power alignment includes a first inductive element 810, a second inductive element 820, and means 830 for detecting position.

In an embodiment, the first inductive element 810 can include, for example, the left coil $D_L$, discussed above with respect to FIG. 6. In an embodiment, the second inductive element 820 can include, for example, the right coil $D_R$, discussed above with respect to FIG. 6. The first and second inductive elements 810 and 820 can be laterally separated.

In an embodiment, means 830 for detecting position can be configured to perform one or more of the functions described above with respect to block 730 (FIG. 7). In various embodiments, the means 830 for detecting position can be implemented by one or more of the electric vehicle alignment system 354 (FIG. 3), the base charging alignment system 352 (FIG. 3), the electric vehicle controller 344 (FIG. 3), the base charging system controller 342 (FIG. 3), or any combination of other processors, DSPs, and/or controllers.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As examples, some electric vehicles may be hybrid electric vehicles that include a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (for example, electronic devices such as personal computing devices and the like).

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless power receiver comprising:
   a first inductive element configured to receive wireless charging power from a transmitter;
   a second inductive element, laterally separated from the first, configured to receive wireless charging power from the transmitter;
   a switch configured to, intermittently, electrically couple a first node, common to both the first and second inductive elements, with a second node, common to both a first sensor and a second sensor;
   the first sensor configured to measure a characteristic between one end of the first inductive element, opposite the first node, and the second node;
   the second sensor configured to measure a characteristic between one end of the second inductive element, opposite the first node, and the second node; and
   a position detector configured to determine a lateral position of the receiver relative to the transmitter based on the measured characteristics, and to provide at least one output for alignment of a vehicle comprising the wireless power receiver based on the determined lateral position.

2. The wireless power receiver of claim 1, wherein at least one characteristic comprises an induced voltage at the first and second inductive elements.

3. The wireless power receiver of claim 1, wherein the first and second inductive elements are electrically connected in series in a "double D" configuration.

4. The wireless power receiver of claim 3, wherein the switch is configured to electrically partition the first and second inductive elements.

5. The wireless power receiver of claim 1, further comprising a quadrature coil substantially between the first and second inductive elements.

6. The wireless power receiver of claim 1, wherein the position detector is further configured to determine a longitudinal position of the receiver relative to the transmitter based on a gradient of a scalar alignment parameter.

7. The wireless power receiver of claim 1, wherein the vehicle comprises an automatic alignment system configured to align the vehicle with respect to the transmitter based on the determined lateral position.

8. A method of detecting alignment at a wireless power receiver, comprising:
   receiving wireless power at a first inductive element from a transmitter;
   receiving wireless power at a second inductive element from the transmitter;
   intermittently, electrically coupling a first node, common to both the first and second inductive elements, with a second node, common to both a first sensor and a second sensor;
   measuring, at the first sensor, a characteristic between one end of the first inductive element, opposite the first node, and the second node;
   measuring, at the second sensor, a characteristic between one end of the second inductive element, opposite the first node, and the second node; and
   determining a lateral position of the receiver relative to the transmitter based on the measured characteristics; and providing at least one output for alignment of a vehicle comprising the wireless power receiver based on the determined lateral position.

9. The method of claim 8, wherein at least one characteristic comprises an induced voltage at the first and second inductive elements.

10. The method of claim 8, wherein the first and second inductive elements are electrically connected in series in a "double D" configuration.

11. The method of claim 10, further comprising electrically partitioning the first and second inductive elements.

12. The method of claim 8, further comprising receiving wireless power at a quadrature coil substantially between the first and second inductive elements.

13. The method of claim 8, further comprising determining a longitudinal position of the receiver relative to the transmitter based on a gradient of a scalar alignment parameter.

14. The method of claim 8, further comprising aligning the vehicle with respect to the transmitter based on the determined lateral position.

15. An apparatus for detecting alignment at a wireless power receiver, comprising:
   a first inductive element configured to receive wireless charging power from a transmitter;
   a second inductive element configured to receive wireless charging power from a transmitter;
   means for, intermittently, electrically coupling a first node, common to both the first and second inductive elements, with a second node, common to both a first means for measuring and a second means for measuring;
   the first means for measuring a characteristic between one end of the first inductive element, opposite the first node, and a second node;
   the second means for measuring a characteristic between one end of the second inductive element, opposite the first node, and a second node; and
   means for determining a lateral position of the receiver relative to the transmitter based on the measured characteristics; and means for providing at least one output for alignment of a vehicle comprising the wireless power receiver based on the determined lateral position.

16. The apparatus of claim 15, wherein at least one characteristic comprises an induced voltage at the first and second inductive elements.

17. The apparatus of claim 15, wherein the first and second inductive elements are electrically connected in series in a "double D" configuration.

18. The apparatus of claim 17, further comprising means for electrically partitioning the first and second inductive elements.

19. The apparatus of claim 15, further comprising a quadrature coil substantially between the first and second inductive elements.

20. The apparatus of claim 15, further comprising means for determining a longitudinal position of the receiver relative to the transmitter based on a gradient of a scalar alignment parameter.

21. The apparatus of claim 15, further comprising means for aligning the vehicle with respect to the transmitter based on the determined lateral position.

22. A non-transitory computer-readable medium comprising code that, when executed, causes a wireless charging apparatus to:
   receive wireless power at a first inductive element from a transmitter;
   receive wireless power at a second inductive element from the transmitter;
   intermittently, electrically couple a node common to both the first and second inductive elements, with a second node, common to both a first sensor and a second sensor;
   measure, at the first sensor, a characteristic between one end of the first inductive element, opposite the first node, and the second node;
   measure, at the second sensor, a characteristic between one end of the second inductive element, opposite the first node, and the second node; and
   determine a lateral position of the receiver relative to the transmitter based on the measured characteristics; and provide at least one output for alignment of a vehicle comprising the wireless charging apparatus based on the determined lateral position.

23. The medium of claim 22, wherein at least one characteristic comprises an induced voltage at the first and second inductive elements.

24. The medium of claim 22, wherein the first and second inductive elements are electrically connected in series in a "double D" configuration.

25. The medium of claim 24, further comprising code that, when executed, causes the apparatus to electrically partition the first and second inductive elements.

26. The medium of claim 22, further comprising code that, when executed, causes the apparatus to receive wireless power at a quadrature coil substantially between the first and second inductive elements.

27. The medium of claim 22, further comprising code that, when executed, causes the apparatus to determine a longitudinal position of the receiver relative to the transmitter based on a gradient of a scalar alignment parameter.

28. The medium of claim 22, further comprising code that, when executed, causes the apparatus to align the vehicle with respect to the transmitter based on the determined lateral position.

* * * * *